Dec. 7, 1965   C. E. GUTSHALL   3,221,793
DOUBLE FLANGED WASHER
Filed Oct. 4, 1963
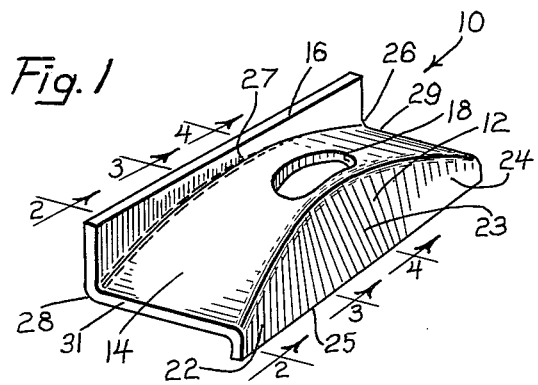
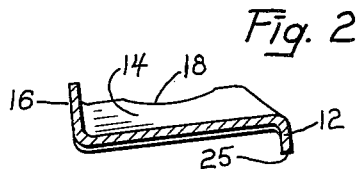
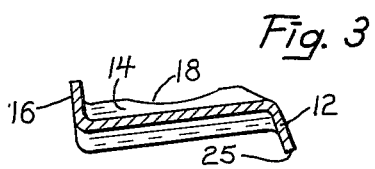
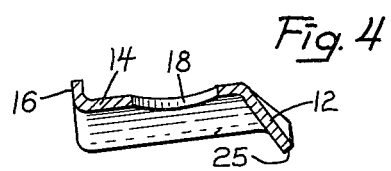
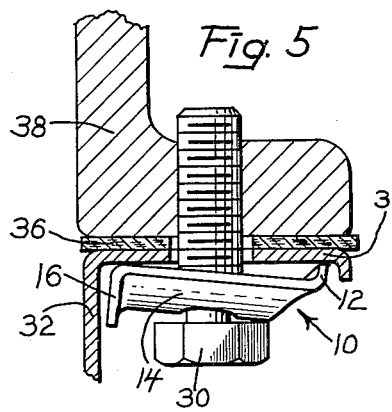
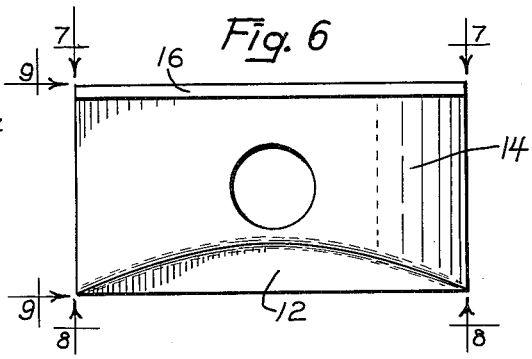
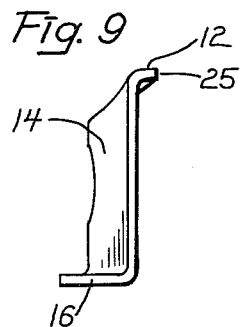
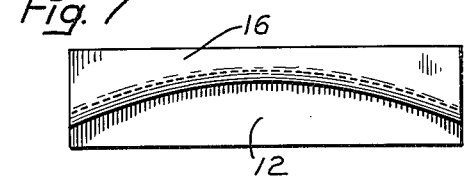
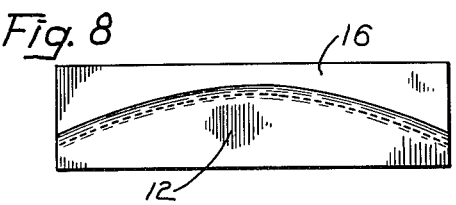
INVENTOR.
Charles E. Gutshall
BY Robert W. Beart
His Att'y United States Patent Office 3,221,793
Patented Dec. 7, 1965

3,221,793
DOUBLE FLANGED WASHER
Charles E. Gutshall, Roselle, Ill., assignor to Illinois Tool Works Inc., Chicago, Ill., a corporation of Delaware
Filed Oct. 4, 1963, Ser. No. 313,890
3 Claims. (Cl. 151—38)

The present invention relates to a novel fastening device, and more particularly relates to a double flanged washer used in conjunction with a rotary fastener.

The attachment of sheet metal oil pans and gaskets to the cast-iron block of engines has been a problem because of several factors. When spring washers of the type known in the art are compressed against the oil pan flange and gasket by the undersurface of a bolt head or the like, sheet metal pan "waves" will be formed between bolts since pressures are not equal under all areas of the bolt head or washer, and the gasket will set or become permanently deformed. This is caused by the use of washers having either little or no retained tension, or washers having a great mount of retained tension which do not apply equalized pressure against the flange and gasket throughout the washer area. The present invention overcomes these known difficulties by the use of a double flange washer having a curved bearing surface between two oppositely directed flanges, one of which has a compound curved surface to relieve to some extent the tension inherent in the curved bearing surface as the washer is forced against a complementary workpiece, and for thereafter applying an equalized pressure against the workpiece.

It is an object of the present invention to provide a novel fastener having a configuration which provides relatively equalized pressure throughout its area when applied to an opposing workpiece while using much thinner materials then would normally be required.

Another object of the present invention is to provide a double flange washer of such a shape that it will retain its spring characteristics when forced against a complementary workpiece by a rotary fastener and prevent loosening and withdrawal of the workpiece.

Still another object of the present invention is the provision of the double flange washer having a novel configuration for use in attaching a sheet metal flanged oil pan and a gasket to the cast-iron block of engines wherein the washer will retain its spring characteristics to counteract gasket set and prevent permanent deformation of the oil pan flange.

A further object of the present invention is to provide a double flange washer which is complemented with an arched body portion and a transversely extending compound curved portion to provide substantial tensile resistance to deflection and relatively equalized pressure against a complementary surface throughout marginal portions of the washer as it is forced against the complementary surface by a rotary fastener.

Another object of the present invention is to provide a parallel-sided resilient sheet metal washer which will withstand heavy loading and retain its spring characteristics over an area subject to tensile loss.

Still a further object of the present invention is to provide a novel double flanged washer which is economical, simple, and efficient in construction and use.

Other objects and advantages of the present invention will become apparent from the following description and the accompanying drawings wherein:

FIG. 1 is a perspective view of the double flanged washer incorporating the features of the present invention;

FIG. 2 is a sectional view of the washer taken along line 2—2 of FIG. 1;

FIG. 3 is a sectional view of the washer taken along line 3—3 of FIG. 1, and showing the axial inclination of one of the flanges;

FIG. 4 is a sectional view of the washer taken along line 4—4 of FIG. 1, and showing the inclination and concavity of one of the flanges of the washer;

FIG. 5 is a side elevational view, partly in section, of the double flanged washer as associated with a rotary fastener in attaching a sheet metal oil pan flange and gasket to a cast-iron engine block;

FIG. 6 is a top plan view of the double flange washer;

FIG. 7 is a rear elevational view of the washer viewed along line 7—7 of FIG. 6;

FIG. 8 is a front elevational view of the washer as seen along line 8—8 of FIG. 6;

FIG. 9 is a side elevational view of the washer as seen along line 9—9 of FIG. 6.

Referring now more specifically to the drawings wherein like parts are designated throughout the various figures, the fastening device or double flanged washer 10, which is used for illustrative purposes in describing the invention, generally comprises an arched body portion 14 bounded by a pair of oppositely directed flange portions 12, 16 and has a polygonal shape. The washer is preferably made from sheet metal, although plastic or other suitable material may be employed.

In the particular environment shown for illustrative purposes in describing the invention, the washer 10 is shown in FIG. 5 as being used in conjunction with a rotary fastener 30 in securing a sheet metal oil pan flange 32 and gasket 36 against a cast-iron engine block 38. The washer may, of course, have other uses than in this particular arrangement, and could be used in any case where it would be necessary to apply an equalized pressure against an opposing workpiece and still have the desired retained tension. It will be observed in FIG. 5 that the undersurface of the headed rotary fastener 30 will bear against the constantly biased arched body portion 14 so as to flatten the same while the flange 12, which bears against the oil pan flange, provides a proportionately deflectable resistance means in relieving the retained tension of the arched body portion as will become apparent hereinafter.

In FIG. 1, the flange 12 is shown as having substantially flat co-planar end portion 22, 24 separated by an outwardly facing concave surface portion 23 which is axially inclined relative to the aperture 18 of the arched washer body. The concavity and inclination of the portion 23 will be greatest in the vicinity of the apex of the arched body portion 14 and will relieve, to some degree, the tension retained in the arched body portion. In most cases, the lines of force created by the tensioned washer will be co-incidental with its shape. The flange 12 is also provided with a work engaging edge 25 as seen in FIGS. 2–4 which will remain completely in contact with the surface of the oil pan flange 32 from zero to maximum tension by virtue of the inclination and concavity of portion 23 on each side of the apex of the arched body portion 14. The shape of flange 12 and its association with the arched body portion will focus initial deflection toward said flange as will subsequently be explained.

Flange 16, which is oppositely directed to flange 12, extends like flange 12 in a direction substantially normal to the arched body portion and will stiffen the overall washer configuration to allow thinner materials to be used. At the juncture of flange 16 and arched body portion 14, there is provided an arcuate extension 27 having at each end work engaging surface portions 26, 28 which aid in providing the equalized pressure of the washer throughout its area. The arcuate extension 27 will act somewhat like a Bellville washer in that a strong beam will be provided at the work engaging surface portions 26, 28 and provide initial contact points when the washer rests freely against the oil pan flange in non-compressed condition. From this washer configuration, there will be provided a structural arrangement which will withstand heavy loading and provide equalized pressure against the oil pan flange and gasket when forced thereagainst.

Prior to compression, the washer will provide a three point contact with the surface of the oil pan flange since it will only be contacted by the work engaging edge 25 and the work engaging surface portions 26, 28. When force is applied through the rotary fastener 30, the arched body portion 14 will become partially flat, and the flange 12 will roll about the work engaging surface portions 26, 28 an edge 25 in a deflectable manner toward the oil pan flange. This will not only prevent loosening and withdrawal of the rotary fastener by a spring action against the undersurface of the rotary fastener head, but will provide equalized pressure against the oil pan flange and gasket in the following manner. When the washer is fully tightened against the oil pan flange and gasket, a four point contact, instead of the initial three point bearing contact, will be provided. This is due to the fact that the arcuate extension 27 is forced into line contact with the flange of the oil pan, and will assume a position substantially like that of work engaging edge 25 which always remains in contact with the surface of the flange. Thus, the arcuate extension 27 and edge 25 will provide two contacts with the oil pan flange surface. The arched body portion, near sides 29, 31 will provide the remaining two contacts with the flange surface when the washer reaches its fully tightened state. If the undersurface area of the arched body portion directly beneath the bolt head is considered, a five point contact with the surface of the flange 32, will be provided. Thus, the washer will provide an equalized pressure generally along its marginal portions against the surface of the flange throughout its bearing contact area and will prevent or substantially overcome the problems heretofore encountered in the art. The washer 10 may be associated with any type of outside force applying means and, is preferably pre-assembled with a rotary fastener such as shown in the drawings in the manner well known in the art. Since the arched body portion 14 of the washer has a slightly curved shape, the opening through which the fastener 30 is received may be slightly elliptical and provide for a shifting of the washer to compensate for the force applied through the rotary fastener. As a result, the load applied through the fastener will be in substantial alignment with its axis and not hinder the manner in which it compresses the washer against the opposing workpiece.

While the illustrated washer 10 is preferably used with flange 16 since it will stiffen the washer configuration and permit thinner materials to be used, it is possible to use a washer having the arched body portion 14 and flange 12 alone. In such a case, the arched body portion will act as a constant biassing means and will cooperate with the proportionately deflectable resistance means incorporated within the flange 12 to focus initial deflection of the washer toward the flange 12 when compressed by an outside force, such as a rotary fastener, against an opposing workpiece in the same manner as described above. Similarly, the four point contact of the washer with the opposing workpiece will be provided when the washer is flattened or substantially flattened against the workpiece to apply relatively equalized pressure against the workpiece throughout the marginal portions of the washer.

From the foregoing, it will now become apparent that the washer is stressed in many directions while distributing its load in an equalized manner over a large flat area. The concepts and principles incorporated in the illustrated washer can obviously be applied to other structural forms and shapes having a square, rectangular or other configuration without changing the functions and results of the illustrated washer.

While the preferred embodiment of the present invention has been shown and described herein, it is obvious that it may be changed without departing from the spirit and scope of the appended claims.

What is claimed is:

1. A one-piece washer made from a four-sided regular polygonal blank of sheet material comprising an arched body portion having an aperture, a flange defined by a plane passed parallel to the edge of one side of said polygonal blank and defining an acute angle with the axis of said aperture, said flange extending downwardly from said body portion on one arched side thereof and including a marginal portion of said washer, said flange presenting an inclined and radially inwardly concave surface portion relative to the axis of said arched body portion aperture and presenting said margin thereof for engagement with the complementary work surface on which it is adapted to be mounted, and a second flange extending upwardly from and along the full length of said body portion on the margin opposite to said first flange and presenting work surface engagement portions at its juncture with said adjacent sides of said polygonal blank, said washer promoting relatively equalized pressure against a complementary workpiece through said marginal and engagement portions of said washer as said portions impinge upon said workpiece.

2. A one-piece washer device of the type described in claim 1, wherein the four-sided regular polygonal blank is of rectangular configuration with said arched body portion extending in the direction of the major measurement of the rectangle, said second flange which extends upwardly from and along the full length of said body portion also being located along the major measurement of said rectangle.

3. A one-piece washer of the type described in claim 2, wherein the aperture is an elongated aperture having its major measurement extending in the same direction as the major measurement of the arched body portion formed from the rectangular blank.

References Cited by the Examiner
UNITED STATES PATENTS

| 1,016,798 | 2/1912 | Thomson et al. | 151—38 |
| 1,644,373 | 10/1927 | Hart | 151—38 |
| 3,164,323 | 1/1965 | Steele et al. | 151—38 |

CARL W. TOMLIN, *Primary Examiner.*

EDWARD C. ALLEN, *Examiner.*